United States Patent
Atlas et al.

(10) Patent No.: US 12,327,323 B2
(45) Date of Patent: Jun. 10, 2025

(54) TECHNIQUES FOR ADAPTIVELY RENDERING VIRTUAL CONTENT N ARTIFICIAL REALITY ENVIRONMENTS BASED ON AMBIENT LIGHTING OF A REAL-WORLD SCENE

(71) Applicant: Meta Platforms Technologies, LLC, Menlo Park, CA (US)

(72) Inventors: Charlene Mary Atlas, Redmond, WA (US); Nathan Matsuda, Seattle, WA (US); Thomas Scott Murdison, Seattle, WA (US); Kevin James MacKenzie, Sammamish, WA (US); Jasmine Soria Sears, Portland, OR (US); Romain Bachy, Seattle, WA (US); Ocean Quigley, Oakland, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/426,091

(22) Filed: Jan. 29, 2024

(65) Prior Publication Data

US 2024/0242447 A1    Jul. 18, 2024

Related U.S. Application Data

(63) Continuation of application No. 17/860,924, filed on Jul. 8, 2022, now Pat. No. 11,887,263, which is a (Continued)

(51) Int. Cl.
*G06T 19/00* (2011.01)
*G06T 5/92* (2024.01)
(Continued)

(52) U.S. Cl.
CPC .............. *G06T 19/006* (2013.01); *G06T 5/92* (2024.01); *G06T 7/74* (2017.01); *G06T 15/205* (2013.01); *G06T 2215/16* (2013.01)

(58) Field of Classification Search
None
See application file for complete search history.

(56) References Cited

U.S. PATENT DOCUMENTS 9,721,391 B2    8/2017 Monaghan et al.
10,354,449 B2*  7/2019 Todeschini ............ G06T 19/006
(Continued)

OTHER PUBLICATIONS

Evangelista B., et al., "Realistic AR Makeup Over Diverse Skin Tones on Mobile," SIGGRAPH Asia 2018 Posters, 2018, 2 pages.
(Continued)

*Primary Examiner* — Ryan M Gray
(74) *Attorney, Agent, or Firm* — Greenberg Traurig, LLP

(57) ABSTRACT

An example method is provided for applying a virtual lighting effect to virtual content based on ambient light associated with a real-world scene. The example method includes obtaining a measurement of ambient light associated with a scene of a real-world environment. The example method includes applying a virtual lighting effect to virtual content based at least in part on the measurement of the ambient light. And the example method includes causing display of the virtual content with the applied virtual lighting effect on a display of a computing device for displaying augmented reality, wherein the scene of the real-world environment is visible through the display.

20 Claims, 15 Drawing Sheets

Related U.S. Application Data continuation of application No. 16/880,207, filed on May 21, 2020, now Pat. No. 11,423,621.

(51) Int. Cl.
  *G06T 7/73* (2017.01)
  *G06T 15/20* (2011.01)

(56) References Cited

U.S. PATENT DOCUMENTS

| | | | |
|---|---|---|---|
| 10,643,398 | B2 | 5/2020 | Esselstrom et al. |
| 10,885,701 | B1 * | 1/2021 | Patel ................ A63F 13/57 |
| 11,087,443 | B2 | 8/2021 | Chen |
| 2012/0075440 | A1 | 3/2012 | Ahuja et al. |
| 2012/0092369 | A1 | 4/2012 | Kim et al. |
| 2013/0194259 | A1 | 8/2013 | Bennett et al. |
| 2014/0125668 | A1 * | 5/2014 | Steed ................ G06T 19/006 345/426 |
| 2014/0168262 | A1 | 6/2014 | Forutanpour et al. |
| 2015/0221133 | A1 | 8/2015 | Groten et al. |
| 2016/0125656 | A1 | 5/2016 | James et al. |
| 2016/0133057 | A1 | 5/2016 | Kaino et al. |
| 2016/0232717 | A1 | 8/2016 | Wong et al. |
| 2016/0379396 | A1 | 12/2016 | Pandey et al. |
| 2017/0090194 | A1 * | 3/2017 | Hayes ................ G02B 27/0101 |
| 2017/0178356 | A1 | 6/2017 | Bhuruth et al. |
| 2017/0200310 | A1 | 7/2017 | Kapinos et al. |
| 2017/0270707 | A1 | 9/2017 | Kass |
| 2017/0287222 | A1 | 10/2017 | Fujimaki |
| 2017/0301145 | A1 | 10/2017 | Miller |
| 2019/0114828 | A1 | 4/2019 | Trowbridge |
| 2020/0074724 | A1 * | 3/2020 | Mathur ................ G06F 3/013 |
| 2020/0193648 | A1 | 6/2020 | Wyble |
| 2020/0225746 | A1 | 7/2020 | Bar-Zeev et al. |
| 2020/0334824 | A1 | 10/2020 | Bleyer et al. |
| 2020/0334908 | A1 | 10/2020 | Wilson et al. |
| 2020/0364939 | A1 | 11/2020 | Knorr et al. |
| 2020/0380647 | A1 | 12/2020 | Eble |
| 2022/0366615 | A1 * | 11/2022 | Damghanian ............ G06T 7/70 |

OTHER PUBLICATIONS

Schwandt T., et al., "A Single Camera Image Based Approach for Glossy Reflections in Mixed Reality Applications," 2016 IEEE International Symposium on Mixed and Augmented Reality (ISMAR), 2016, 7 pages.

* cited by examiner

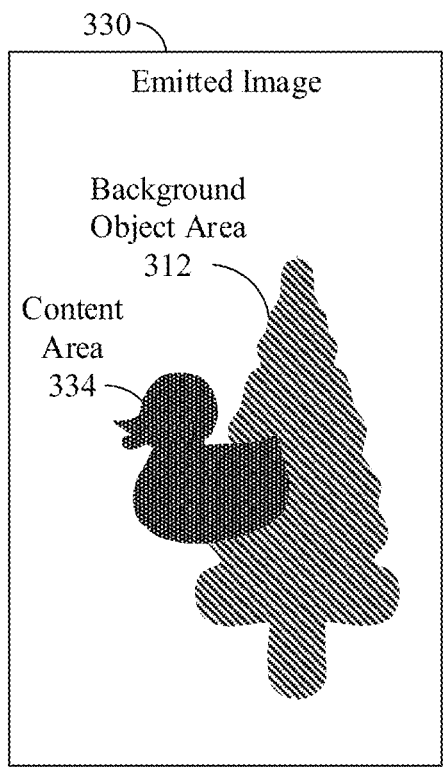
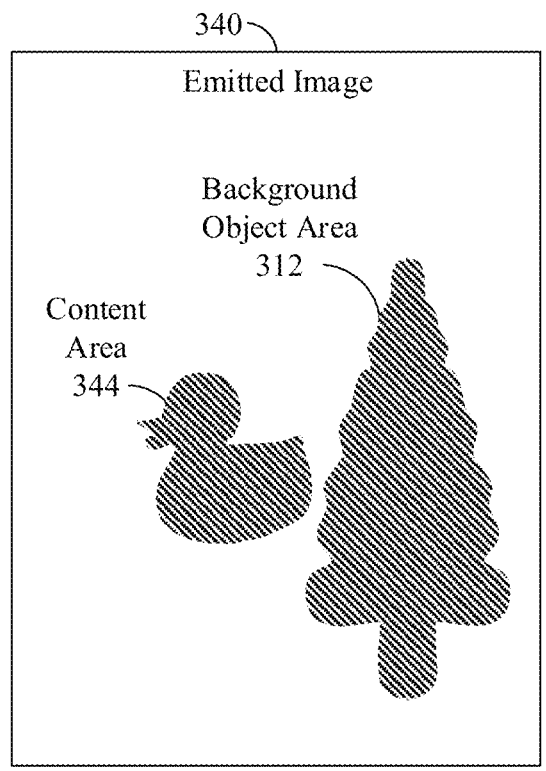
FIG. 3E
FIG. 3F
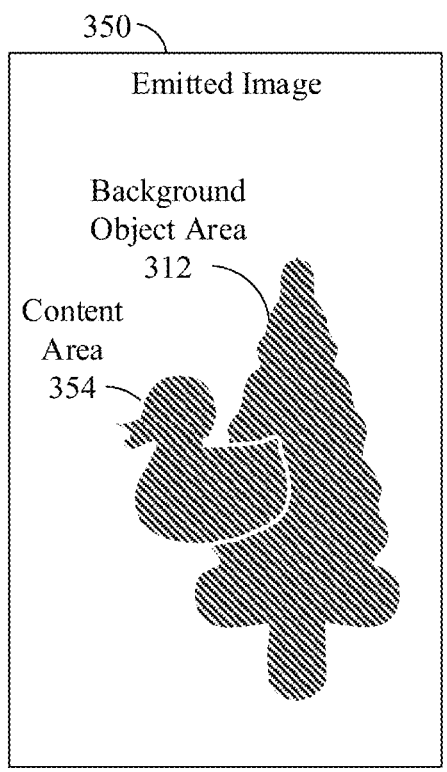
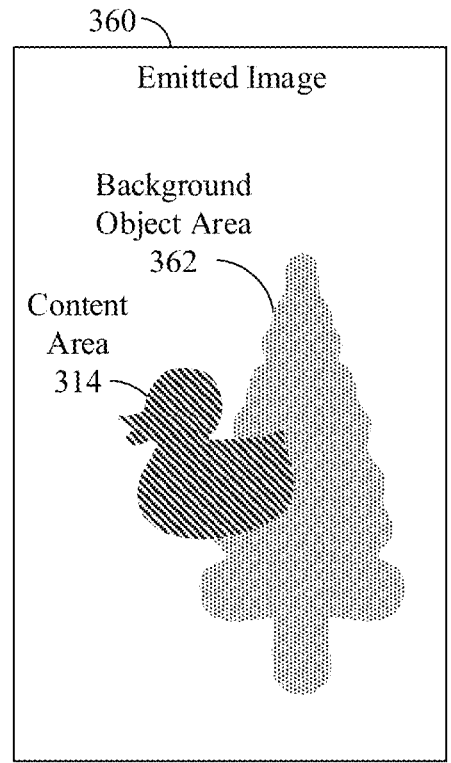
FIG. 3G
FIG. 3H

TECHNIQUES FOR ADAPTIVELY RENDERING VIRTUAL CONTENT N ARTIFICIAL REALITY ENVIRONMENTS BASED ON AMBIENT LIGHTING OF A REAL-WORLD SCENE

CROSS-REFERENCE TO RELATED APPLICATIONS

This application is a continuation of U.S. patent application Ser. No. 17/860,924, filed on Jul. 8, 2022, entitled "Adaptive Rendering In Artificial Reality Environments," which is a continuation under 35 U.S.C. § 120 of U.S. patent application Ser. No. 16/880,207, filed 21 May 2020 (U.S. Pat. No. 11,423,621), entitled "Adaptive Rendering In Artificial Reality Environments," which is incorporated by reference herein in its entirety.

TECHNICAL FIELD

This disclosure generally relates generally to artificial reality environments, and, more particularly, to adaptive rendering in artificial reality environments.

BACKGROUND

Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, for example, used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, an Augmented Reality (AR) system may adaptively determine one or more aspects of how virtual content is generated and/or displayed based on factors such as characteristics of the real-world environment and user preferences about how content is to be shown. AR systems can present views of the real world augmented with virtual content, for example, on a see-through head-mounted display. However, when the virtual content is combined with the image of the real world using additive techniques, problems can arise in which the virtual content is difficult to perceive or distinguish from, for example, the real-world environment. For example, AR virtual content that lacks contrast with the real-world, can be difficult to see in a head-mounted display. For example, AR virtual content may be changed adaptively in ways that, when combined with the underlying real-world environment, may result in an additive light image that appears more perceptible and identifiable as compared to, for example, the original AR virtual content. In some embodiments, the present adaptive rendering techniques may be provided to increase contrast between the real-world environment and the AR virtual content overlaid thereon to increase perceptibility of the rendered AR virtual content with respect to the real-world environment. For example, as will be further appreciated herein, the present adaptive rendering techniques may adaptively adjust aspects of the appearances of the AR virtual content to improve the clarity, sharpness, perceptibility, fidelity, and identifiability of the virtual content with respect to one or more characteristics of the real-world environment onto which the AR virtual content is overlaid. Indeed, it should be appreciated that while aspects of the appearances of the AR virtual content may be adaptively adjusted, the present adaptive rendering techniques may do so without compromising or distorting the desirable and expected appearances of the AR virtual content (e.g., leaves of a tree desirably and expected to include hues of green may not be adjusted to appear pink in hue).

In certain embodiments, adaptive rendering may be performed by detecting characteristics of a real-world environment, determining user preferences for how AR virtual content is to be rendered, adaptively adjusting the AR virtual content in accordance with the detected characteristics and the user preferences, and presenting the rendered AR virtual content to the user in accordance with the detected characteristics. In some embodiments, the adaptive rendering may include adjusting certain aspects or the appearances of the AR virtual content, for example, by changing the AR virtual content's color or emphasizing certain areas of the AR virtual content to increase the contrast between the AR virtual content and the real-world environment rendered concurrently therewith. For example, in one embodiment, an item or portion of AR virtual content may be adaptively adjusted based on its current location within a particular scene of the real-world environment, particularly when the current location limits the perceptible contrast between the item or portion of AR virtual content. Indeed, in some embodiments, because the adaptive adjustments to the item or portion of the AR virtual content may depend on certain characteristics of the real-world environment, a particular item or portion of AR virtual content may be adaptively adjusted differently from that of other items or portions of the AR virtual content in different areas of the same particular scene. In certain embodiments, the presentation of the adaptively adjusted AR virtual content may include adjustments to aspects of how all of the content is displayed, such as the brightness level used in a display device when the content is projected onto the user's field of view (FOV). Examples of AR virtual content may include stickers, text, avatars, images, videos, or any other object to be displayed in the AR environment. In this way, the present adaptive rendering techniques may be provided to increase contrast between the real-world environment and the AR virtual content overlaid thereon to increase perceptibility of the AR virtual content with respect to the real-world environment. Specifically, by adaptively adjusting aspects of the appearances of the AR virtual content, the clarity, sharpness, perceptibility, fidelity, and identifiability of the AR virtual content may be improved with respect to one or more characteristics of the real-world environment onto which the AR virtual content is overlaid. Additionally, the present adaptive rendering techniques may also be selectively and optimally applied based on the particular application or other performance metric, such that a particular one or more of the present adaptive rendering techniques may be selected and applied to limit power consumption and processing power, for example, while other adaptive rendering techniques may be applied to increase computational efficiency and storage capacity, and vice-versa.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, for example, used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3D-3G illustrate examples in which virtual content has been modified to increase its perceptibility when overlaid on a real-world scene.

FIG. 3H illustrates an example in which a real-world scene has been modified to increase the perceptibility of overlaid virtual content.

DESCRIPTION OF EXAMPLE EMBODIMENTS

Figure 1:
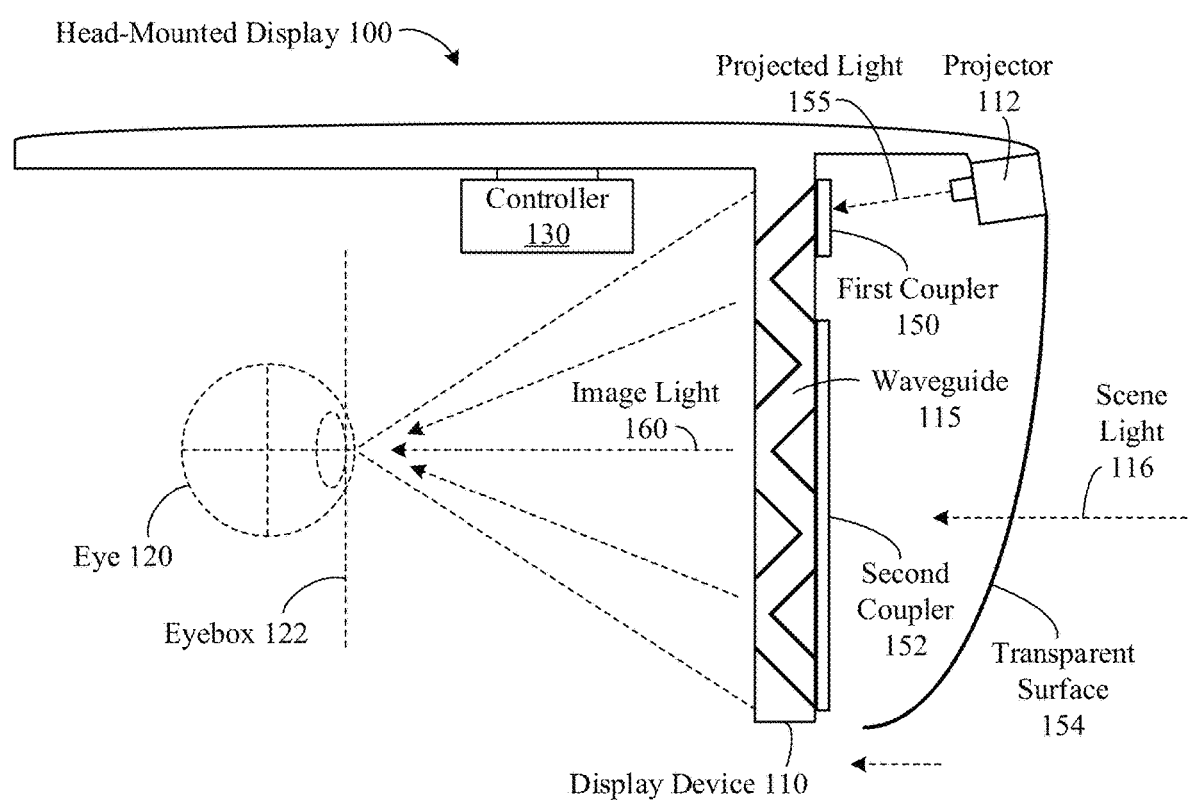
FIG. 1 illustrates a cross-section of an example head-mounted display.

Because artificial reality devices involve creating digital scenes or superposing computer-generated imagery onto a view of the real world, they provide a platform for designers and engineers to provide new forms of information, entertainment, or methods of collaboration. For example, artificial reality devices may allow users to communicate, seemingly in person, over long distances, or assist users by informing them of the environment around them in an unobtrusive manner. Because artificial reality experiences can often be customized, the user's experience with artificial reality may be deeply personal and highly engaging if presented with sufficient clarity and convenience.

One way that artificial reality experiences can augment human ability is with computer-generated images and/or text added to the real world, as in an augmented or mixed reality. From this simple principle, a variety of compelling use cases can be considered. Labels (e.g., texts, glyphs, etc.) or images describing a real-world object may be fixed in the world space (e.g., location-aware labels acting as street signs or providing a live map of a bike path), or images fixed to a real-world object as it moves through the space (e.g., a label added to a bus as it going on its route that provides detailed information about its route or capacity). Labels could also be used to help a user navigate through an unfamiliar city (e.g., creating a waypoint for the nearest restroom), or help find a friend in a crowd (e.g., a socially-aware waypoint fixed to another user). Other experiences worth considering may be based on interactions with real-world objects. For example, a user could "project" video onto a wall or screen that allows for the video to be played and visible to only herself or to others with access to a shared augmented space. As another example, a user could fix computer-generated text to a physical object to act as an augmented-reality book or magazine. Content could be displayed relative to the object (allowing a user to physical asset aside an augmented-reality) or could be displayed in a fixed relation to the user's (e.g., a tutorial video constantly playing in a corner of the view). Presented media could be customized to the user, so that the same content display space could content relevant to each person viewing the same physical space. As another example, a user could interact with computer-generated graphics by "touching" an icon, or "manipulating" the computer-generated images manually. These graphics could be shown to multiple users working on a project, enabling opportunities for team collaboration (e.g., multiple architects working on a three-dimensional digital prototype in a building together in real-time).

To facilitate use, the display that outputs the computer-generated graphics should be intuitive, easily accessible, and unobtrusive. One approach to displaying high definition artificial reality graphics to a user is a head-mounted display (HMD) comprising a near eye display (NED). The user wears an apparatus, such as a visor, headset, or glasses, capable of displaying computer graphics. In augmented or mixed reality experiences, the computer graphics can be seen alongside, or on top of, the physical world. However, rendering these computer graphics is computationally intensive. Therefore, in most cases rendering is performed by powerful computers communicatively attached (e.g., via a cable or wireless communication protocol, such as Bluetooth) to an HMD. In such a configuration, the HMD is limited by bulky cords, bandwidth and power limitations, heat restrictions, and other related constraints. Yet, the limits of these constraints are being pushed. HMDs that are comfortable and efficient enough for day-long wear, yet powerful enough to display sophisticated graphics are currently being developed.

FIG. 1 illustrates a cross-section of an example head-mounted display (HMD) 100. The HMD includes an example wearable display device 110, which may include at least one waveguide 115. It should be appreciated that the HMD 100 as illustrated is an example of one embodiment of an HMD that may be useful in providing adaptive rending, in accordance with the presently disclosed embodiments. In another embodiment, the HMD 100 may include a see-through HMD which may not include a waveguide and may instead render images directly onto, for example, one or more transparent or semi-transparent mirrors that may be placed in front of the eyes of a user, for example. FIG. 1 also shows an eyebox 122, which is a location where a user's eye 120 may be positioned when the user wears the display device 110. As long as the eye 120 is aligned with the eyebox 122, the user may be able to see a full-color image, or a pupil replication directed toward the eyebox 122 by the waveguide 115. The waveguide 115 may produce and direct many pupil replications to the eyebox 122. The waveguide 115 may be configured to direct image light 160 to the eyebox 122 located proximate to the eye 120. For purposes of illustration, FIG. 1 shows the cross-section associated with a single eye 120 and single waveguide 115. In particular embodiments, the waveguide 115 or another waveguide may provide image light to an eyebox located at another eye of the user.

The waveguide 115 may be composed of one or more materials (e.g., plastic, glass, etc.) with one or more refractive indices that effectively minimize the weight and widen a field of view (FOV) of the display device 110. In alternate configurations, the display device 110 may include one or more optical elements between the waveguide 115 and the eye 120. The optical elements may act to, for example, correct aberrations in the image light 160, magnify the image light 160, make some other optical adjustment of the image light 160, or perform a combination thereof. Examples of optical elements may include an aperture, a Fresnel lens, a refractive (e.g., convex and/or concave) lens, a reflective surface, a filter, or any other suitable optical element that affects image light. The waveguide 115 may include a waveguide with one or more sets of Bragg gratings, for example.

One form of display that may be used in an HMD 100 may be referred to as a scanline or one-dimensional ("1D") waveguide display. In this display, a row of a light source may generate the light that is used to illuminate the entire vertical space (or horizontal space, where appropriate) of the display. Multiple smaller images may be combined to form a larger composite image as perceived by the viewer. A scanning element may cause the source light, treated by waveguide components, to be output to the eye 120 of the user in a specific pattern corresponding to a generation pattern used by the emitters to optimize display draw rate. For example, the light source may first be provided color values corresponding to a single row of pixels along the top of a display image. The light may be transferred to the appropriate section of the eyebox 122 using a waveguide-based process assisted with a microelectromechanical system (MEMS)-powered oscillating mirror. After a short period of time, the light source may be provided color values corresponding to the next row of pixels (e.g., below the first). The light for this section of the image may then use the same process to position the color values in the appropriate position. Scanning displays may utilize less power to run and may generate less heat than traditional displays comprised of the same emitters. Scanning displays may have less weight as well, owing in part to the quality of the materials used in the scanning element and optics system. The frame rate of the display may be limited based on the oscillation speed of the mirror.

Another form of display that may be used in an HMD 100 may be a 2D or two-dimensional waveguide display. In such a display, no oscillating mirror is utilized, as a light source may be used that comprises vertical and horizontal components (e.g., in an array). Where the 1D variant lights the display on a row-by-row basis, the 2D variant may be capable of providing a significantly improved frame rate because it is not dependent on the oscillating mirror to provide for the vertical component of an image. To further improve the frame rate, the light source of a 2D waveguide display may be bonded to the controller and/or memory providing driving instructions for the display system. For example, the light source may be bonded to the memory that holds the color instructions for the display and/or the driver transistors. The result of such a configuration is that the light source for such a display may be operable with a considerably faster frame rate.

In particular embodiments, an HMD 100 may comprise a light source such as a projector 112 that emits projected light 155 depicting one or more images. Many suitable display light source technologies are contemplated, including, but not limited to, liquid crystal display (LCD), liquid crystal on silicon (LCOS), light-emitting diode (LED), organic LED (OLED), micro-LED (µLED), digital micromirror device (DMD), any other suitable display technology, or any combination thereof. The projected light 155 may be received by a first coupler 150 of the waveguide 115. The waveguide 115 may combine the projected light 155 with real-world scene light 116 received by a second coupler 152. The scene light 116 may be, for example, light from a real-world environment, and may pass through a transparent (or semi-transparent) surface 154 to the second coupler 152. The transparent surface 154 may be, for example, a protective curved glass or a lens formed from glass, plastic, or other transparent material. The coupling components of the waveguide 115 may direct the projected light 155 along a total internal reflection path of the waveguide 115. The scene light 116 may be seen by the user's eye 120.

Furthermore, the projected light 155 may first pass through a small air gap between the projector 112 and the waveguide 115 before interacting with a coupling element incorporated into the waveguide (such as the first coupler 150). The light path, in some examples, can include grating structures or other types of light decoupling structures that decouple portions of the light from the total internal reflection path to direct multiple instances of an image, "pupil replications," out of the waveguide 115 at different places and toward the eyebox 122 of the HMD 100.

In particular embodiments, one or more controllers 130 may control the operations of the projector 112. The controller 130 may generate display instructions for a display system of the projector 112. The display instructions may include instructions to project or emit one or more images. In particular embodiments, display instructions may include frame image color data. The display instructions may be received from, for example, a processing device included in the HMD 100 of FIG. 1 or in wireless or wired communication therewith. The display instructions may further include instructions for moving the projector 112 or for moving the waveguide 115 by activating an actuation system. The controller 130 may include a combination of hardware, software, and/or firmware not explicitly shown herein so as not to obscure other aspects of the disclosure.

Figure 2:
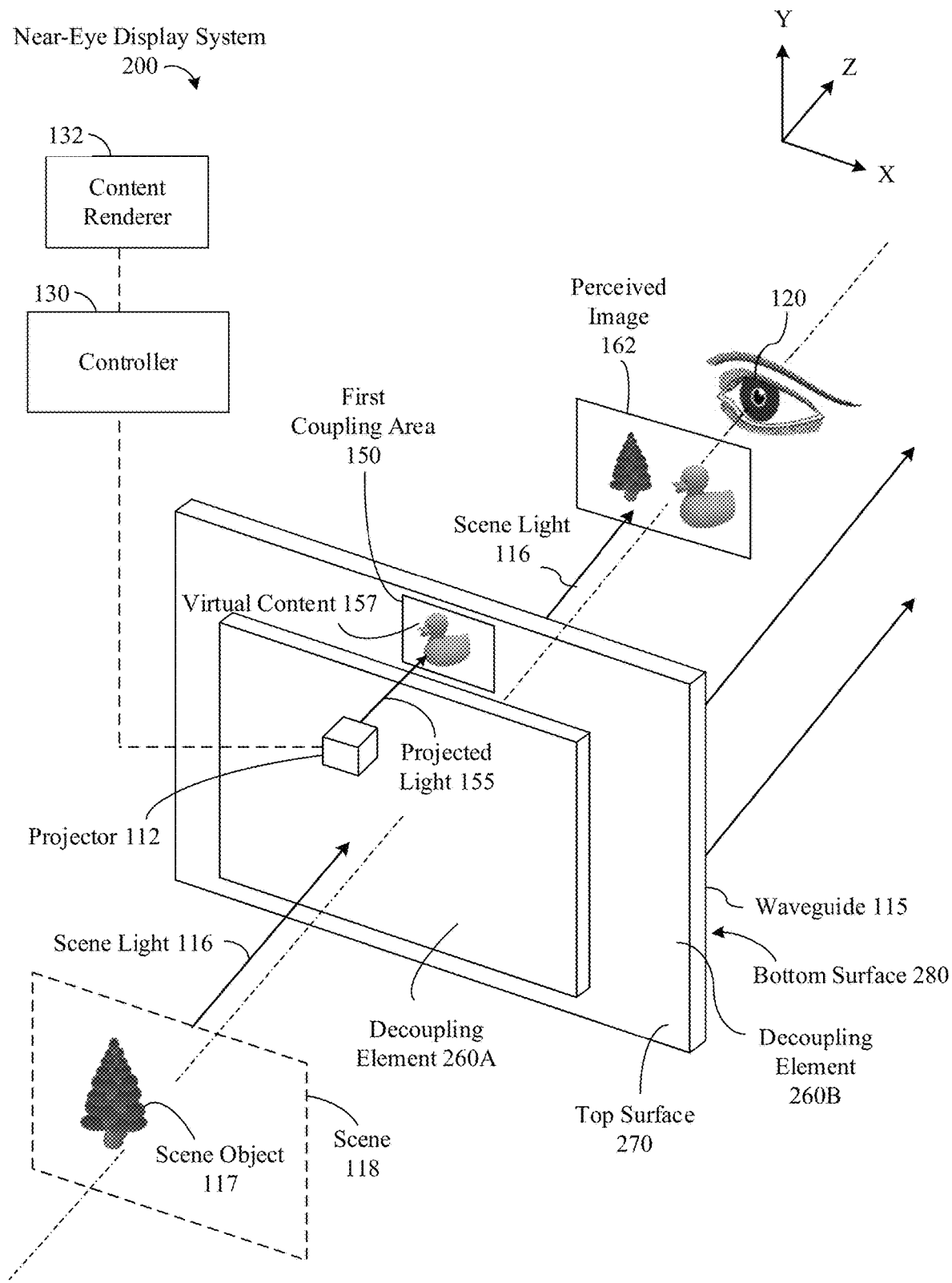
FIG. 2 illustrates an isometric view of an example near-eye display system.

FIG. 2 illustrates an example isometric view of a near-eye display system (NED) 200. In particular embodiments, the NED 200 may be a component of the HMD 100. The NED 200 may include at least one projector 112, a waveguide 115, and a controller 130. A content renderer 132 may generate representations of content, referred to herein as AR virtual content 157, to be projected as projected light 155 by the projector 112. The content renderer 132 may send the representations of the content to the controller 130, which may in turn generate display instructions based on the content and send the display instructions to the projector 112.

For purposes of illustration, FIG. 2 shows the NED 200 associated with a single eye 120, but in other embodiments another projector 112, waveguide 115, or controller 130 that is completely separate or partially separate from the NED 200 may provide image light to another eye of the user. In a partially separate system, one or more components may be shared between the waveguides for each eye. In one embodiment, a single waveguide 115 may provide image light to both eyes of the user. Also, in some examples, the waveguide 115 may be one of multiple waveguides of the NED 200. In another embodiment, in which the HMD includes a see-through HMD, the image light may be provided onto, for example, one or more transparent or semi-transparent mirrors that may be placed in front of the eyes of the user.

In particular embodiments, the projector 112 may include one or more optical sources, an optics system, and/or circuitry. The projector 112 may generate and project the projected light 155, including at least one two-dimensional image of AR virtual content 157, to a first coupling area 150 located on a top surface 270 of the waveguide 115. The image light 155 may propagate along a dimension or axis toward the coupling area 150, for example, as described above with reference to FIG. 1. The projector 112 may comprise one or more array light sources. The techniques and architectures described herein may be applicable to many suitable types of displays, including but not limited to liquid crystal display (LCD), liquid crystal on silicon (LCOS), light-emitting diode (LED), organic LED (OLED), micro-LED (µLED), or digital micromirror device (DMD).

In particular embodiments, the waveguide 115 may be an optical waveguide that outputs two-dimensional perceived images 162 in the scene light 116 (e.g., with respect to a scene object 117 and scene 118) directed to the eye 120 of a user. The waveguide 115 may receive the projected light 155 at the first coupling area 150, which may include one or more coupling elements located on the top surface 270 and/or within the body of the waveguide 115 and may guide the projected light 155 to a propagation area of the waveguide 115. A coupling element of the coupling area 150 may be, for example, a diffraction grating, a holographic grating, one or more cascaded reflectors, one or more prismatic surface elements, an array of holographic reflectors, a metamaterial surface, or a combination thereof. In particular configurations, each of the coupling elements in the coupling area 150 may have substantially the same area along the X-axis and the Y-axis dimensions, and may be separated by a distance along the Z-axis (e.g., on the top surface 270 and the bottom surface 280, or both on the top surface 270 but separated by an interfacial layer (not shown), or on the bottom surface 280 and separated with an interfacial layer or both embedded into the body of the waveguide 115 but separated with the interfacial layer). The coupling area 150 may be understood as extending from the top surface 270 to the bottom surface 280. The coupling area 150 may redirect received projected light 155, according to a first grating vector, into a propagation area of the waveguide 115 formed in the body of the waveguide 115 between decoupling elements 260.

A decoupling element 260A may redirect the totally internally reflected projected light 155 from the waveguide 115 such that the light 155 may be decoupled through a decoupling element 260B. The decoupling element 260A may be part of, affixed to, or formed in, the top surface 270 of the waveguide 115. The decoupling element 260B may be part of, affixed to, or formed in, the bottom surface 280 of the waveguide 115, such that the decoupling element 260A is opposed to the decoupling element 260B with a propagation area extending therebetween. The decoupling elements 260A and 260B may be, for example, a diffraction grating, a holographic grating, an array of holographic reflectors, etc., and together may form a decoupling area. In particular embodiments, each of the decoupling elements 260A and 260B may have substantially the same area along the X-axis and the Y-axis dimensions and may be separated by a distance along the Z-axis.

AR Adaptive Rendering

In particular embodiments, an AR system may adaptively determine one or more aspects of how virtual content is generated and/or displayed based on factors such as characteristics of the real-world environment and user preferences about how content is to be shown. AR systems can present views of the real world augmented with virtual content, for example, on a see-through head-mounted display or other head-mounted display. However, when the virtual content is combined with the image of the real world using additive techniques, problems can arise in which the virtual content is difficult to perceive or distinguish from, for example, the real-world environment. For example, AR virtual content that is similar in color to the real-world environment behind it, or otherwise lacks contrast with the real-world, can be difficult to see in a head-mounted display. For example, AR virtual content may be changed adaptively in ways that, when combined with the underlying real-world environment, may result in an additive light image that appears more perceptible and identifiable as compared to, for example, the original AR virtual content. In some embodiments, the present adaptive rendering techniques may be provided to increase contrast between the real-world environment and the AR virtual content overlaid thereon to increase perceptibility of the rendered AR virtual content with respect to the real-world environment. For example, as will be further appreciated herein, the present adaptive rendering techniques may adaptively adjust aspects of the appearances of the AR virtual content to improve the clarity, sharpness, perceptibility, fidelity, and identifiability of the virtual content with respect to one or more characteristics of the real-world environment onto which the AR virtual content is overlaid. Indeed, it should be appreciated that while aspects of the appearances of the AR virtual content may be adaptively adjusted, the present adaptive rendering techniques may do so without compromising or distorting the desirable and expected appearances of the AR virtual content (e.g., leaves of a tree desirably and expected to include hues of green may not be adjusted to appear pink in hue).

In certain embodiments, adaptive rendering may be performed by detecting characteristics of a real-world environment, determining user preferences for how AR virtual content is to be rendered, adaptively adjusting the AR virtual content in accordance with the detected characteristics and the user preferences, and presenting the rendered AR virtual content to the user in accordance with the detected characteristics. In some embodiments, the adaptive rendering may include adjusting certain aspects or the appearances of the AR virtual content, for example, by changing the AR virtual content's color or emphasizing certain areas of the AR virtual content to increase the contrast between the AR virtual content and the real-world environment rendered concurrently therewith. For example, in one embodiment, an item or portion of AR virtual content may be adaptively adjusted based on its current location within a particular scene of the real-world environment, particularly when the current location limits the perceptible contrast between the item or portion of AR virtual content. Indeed, in some embodiments, because the adaptive adjustments to the item or portion of the AR virtual content may depend on certain characteristics of the real-world environment, a particular item or portion of AR virtual content may be adaptively adjusted differently from that of other items or portions of the AR virtual content in different areas of the same particular scene. In certain embodiments, the presenting of the adaptively adjusted AR virtual content may include adjustments to aspects of how all of the content is displayed, such as the brightness level used in a display device when the content is projected onto the user's FOV. Examples of AR virtual content may include stickers, text, avatars, images, videos, or any other object to be displayed in the AR environment. In this way, the present adaptive rendering techniques may be provided to increase contrast between the real-world environment and the AR virtual content overlaid thereon to increase perceptibility of the AR virtual content with respect to the real-world environment. Specifically, by adaptively adjusting aspects of the appearances of the AR virtual content, the clarity, sharpness, and perceptibility of the AR virtual content may be improved with respect to one or more characteristics of the real-world environment onto which the AR virtual content is overlaid. Additionally, the present adaptive rendering techniques may also be selectively and optimally applied based on the particular application or other performance metric, such that a particular one or more of the present adaptive rendering techniques may be selected and applied to limit power consumption and processing power, for example, while other adaptive rendering techniques may be applied to increase computational efficiency and storage capacity, and vice-versa.

The term "rendering" may refer to a process of generating an image that depicts virtual content. The rendering process may generate the image based on another representation of the virtual content, for example, based on 3D models of objects that represent the virtual content. The image generated by the rendering process may then be provided to a display engine, which may provide display data based on the rendered image to eye display systems. The display engine may perform at least a portion of the rendering process.

As noted above, problems with displaying AR virtual content, such as the content being difficult to distinguish from the real-world background, may arise because the AR virtual content is additively overlapped onto the real-world by adding the color value of each pixel of the content to the color value of the real world at the corresponding location in a scene. This additive technique used in AR systems can result in AR virtual content being difficult to see when there is lack of contrast between the rendered AR virtual content and the real world. Further, even if the AR virtual content is clearly perceptible, it can appear in different colors as a result of blending with the background. As another example, the AR virtual content is projected using light, but darkness cannot be projected, so the background shows through darker portions of content more than brighter portions. One solution to is to increase the brightness of the projected light, but headsets have power and thermal constraints that limit the amount of brightness.

Figure 3A:
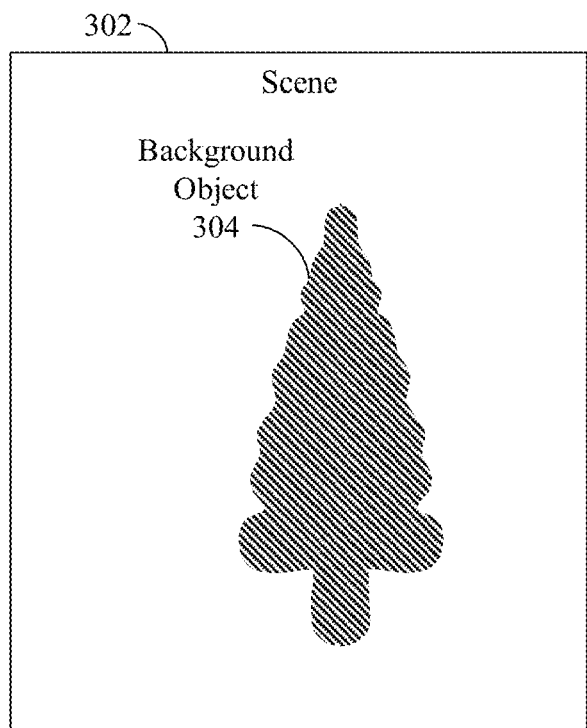
FIG. 3A illustrates an example scene depicting a real-world object.

FIG. 3A illustrates an example scene 302 depicting a real-world object 304. The scene may be viewed by a user of a head-mounted display (HMD) 100 such as that shown in FIG. 1. An image of the real-world object 304 and scene light 116 may be directed to an eye 120 of a user for viewing. The real-world object 304 may be displayed on the display device 110 in a perceived image 162 with particular attributes that are perceptible to the eye 120. For example, the real-world object 304 may be displayed in particular colors, such as hues of green, with particular brightness. The HMD 100 may overlay AR virtual content 157 on the scene light 116. Thus, the real-world object 304 may appear to the eye 120 as a background object, particularly if the AR virtual content 157 overlaps the real-world object 304 on the perceived image 162, in which case the AR virtual content 157 may appear to be blended with the overlapped area of the real-world object 304. In some cases, depending on the colors, brightness, or other visible attributes of the real-world object 304 and the AR virtual content 157, the AR virtual content 157 and/or the real-world object 304 may be difficult for the eye 120 to see and identify in the perceived image 162. For example, if there is a lack of contrast between the AR virtual content 157 and the real-world object 304, the eye 120 may have difficulty distinguishing the AR virtual content 157 and the real-world object 304 from each other. As another example, if the color of the AR virtual content 157 is darker, then little or no light 155 may be projected by the projector 112, and the AR virtual object 157 is effectively transparent to the eye 120.

Figure 3B:
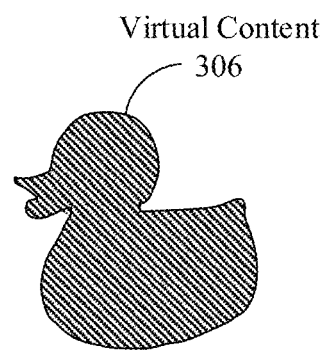
FIG. 3B illustrates an example of virtual content.

FIG. 3B illustrates an example of AR virtual content 306. The AR virtual content 306, which is a depiction of a duck (which could be a 3D object) in this example, may be generated by a content renderer 132 and/or a controller 130, and projected by a projector 112 onto a waveguide 115. The waveguide 115 may overlay the AR virtual content 304 onto scene light 116 to form an emitted image 116 in which the AR virtual content 304 may be viewable by a user's eye 120.

Figure 3C:
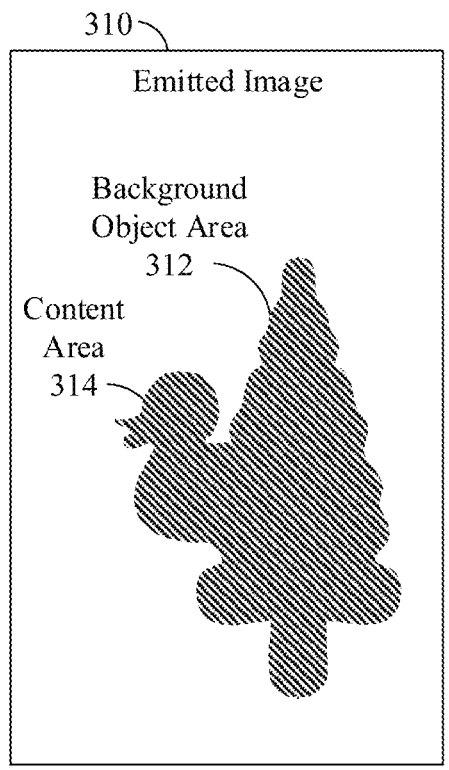
FIG. 3C illustrates an example image in which virtual content is overlaid on a real-world scene.

FIG. 3C illustrates an example image 310 in which AR virtual content is overlaid on a real-world scene. The example image 310 may be viewable by a user's eye 120. The AR virtual content 306 (the duck) appears in the image 310 and occupies an area illustrated as content area 314. The background object 304 (the tree) appears in the image and occupies an area illustrated as background object area 312. The appearances of the content area 314 and the background object area 312 are represented by patterns. The content area 314 becomes difficult or impossible to see when overlaid on the background object 312, so both are shown using the same pattern of diagonal lines. The locations of the AR virtual content area 314 and the background object area 312 may be determined by, for example, the content renderer 132 and/or controller 130 based on instructions from an application or other component of the AR system. In this example, the content renderer 132 has placed the content area 314 at a location that partially overlaps the background object area 312. As can be seen, the portion of the content area 314 that overlaps the background object area 312 is not clearly displayed because its lack of contrast to that of the background object area 312. In other words, there is little to no contrast between the AR virtual content area 314 and the background object area 312. As described below, the clarity of the displayed content area 314 can be improved by rendering the background object area 312 adaptively based on characteristics of the environment, such as the color of the background object area 312. The contrast between the content and the background can be increased, for example, so that the content and background can be more clearly seen. Examples of adaptively-rendered content areas are shown in FIGS. 3D-3G. Alternatively or additionally, the clarity of the displayed content area 314 can be improved by modifying other factors, such as the brightness of the background object area 312, as shown in FIG. 3H.

Figure 3D:
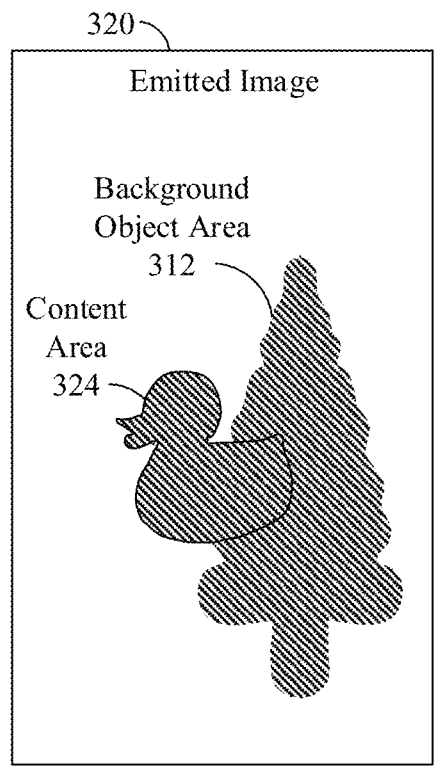

FIGS. 3D-3G illustrate examples in which AR virtual content has been modified to increase its perceptibility when overlaid on a real-world scene. In FIG. 3D, an emitted image 320 includes a perimeter line has been rendered around the content area 324, so the content area can clearly be seen in front of the background object area 312. In FIG. 3E, an emitted image 330 includes the appearance of the content area 334 has been changed to a color or brightness that has a greater amount of contrast with the color and brightness of the background object area 312, and the content area 334 can be clearly seen. In FIG. 3F, an emitted image 340 includes the content area 344 has been moved away from the background object area 312 so that the two no longer overlap and both can be clearly seen. In FIG. 3G, an emitted image 350 includes an outline has been rendered around the part of the content area 354 overlapping the visibility-reducing background object area 312.

FIG. 3H, an emitted image 360 illustrates an example in which a real-world scene has been modified to increase the perceptibility of overlaid AR virtual content. In FIG. 3H, a brightness level of the background object area 362 has been reduced, for example, by using active dimming of the HMD 100 to reduce the transmission of scene light 116 through a lens in response to an electrical signal. Reducing the brightness of the background object area 362 increases the contrast with the content area 314, thereby increasing the perceptibility of the portion of the content area 314 that overlaps the background object area 362.

Figure 4A:
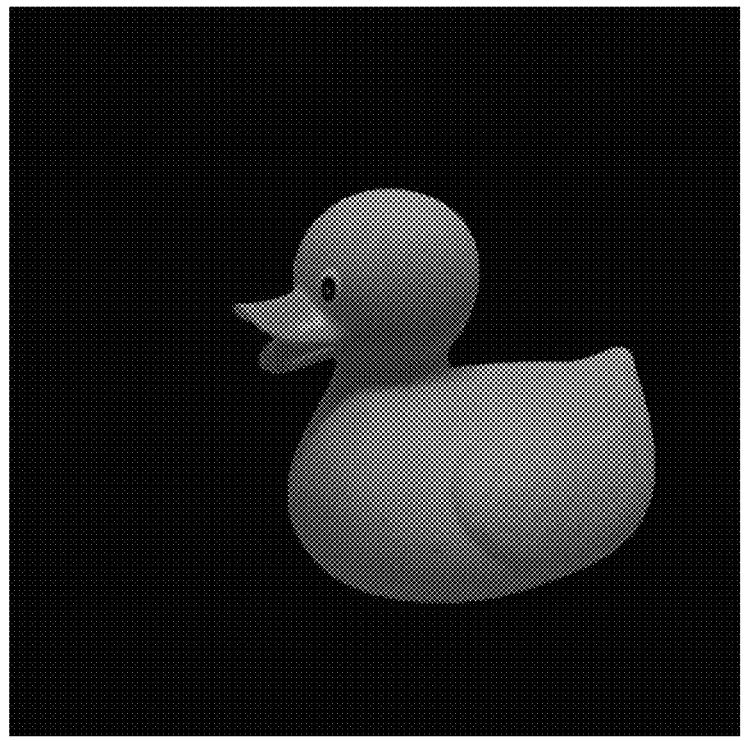
FIG. 4A illustrates a baseline example of rendered virtual content.
Figure 4B:
FIG. 4B illustrates an example in which baseline rendered virtual content has been overlaid on a scene.

FIG. 4A illustrates a baseline example of rendered AR virtual content. The rendered AR virtual content, which is an image of a duck in this example, has been generated independently of characteristics of the environment and user preferences. The baseline rendered AR virtual content is described further with reference to FIG. 3B above. FIG. 4B illustrates an example in which baseline rendered AR virtual content has been overlaid on a scene. The scene depicts a plant-like glass sculpture, a partially-transparent curtain with numerous small light sources, as well as a doorway, a wall, small trees, and table-like surfaces. Because of the numerous objects of different colors, brightnesses, and/or spatial frequencies, the AR virtual content (the duck) is not clearly perceptible when rendered over the scene. Darker portions of the scene, such as the red orange, purple, and brown portions of the plants, appear to be more vivid and/or solid than the AR virtual content, and the portions of the AR virtual content that overlay the plants are difficult to see. The portions of the AR virtual content that overlay the less saturated and less colorful portions are less difficult to see, but still not clearly perceptible.

Figure 5A:
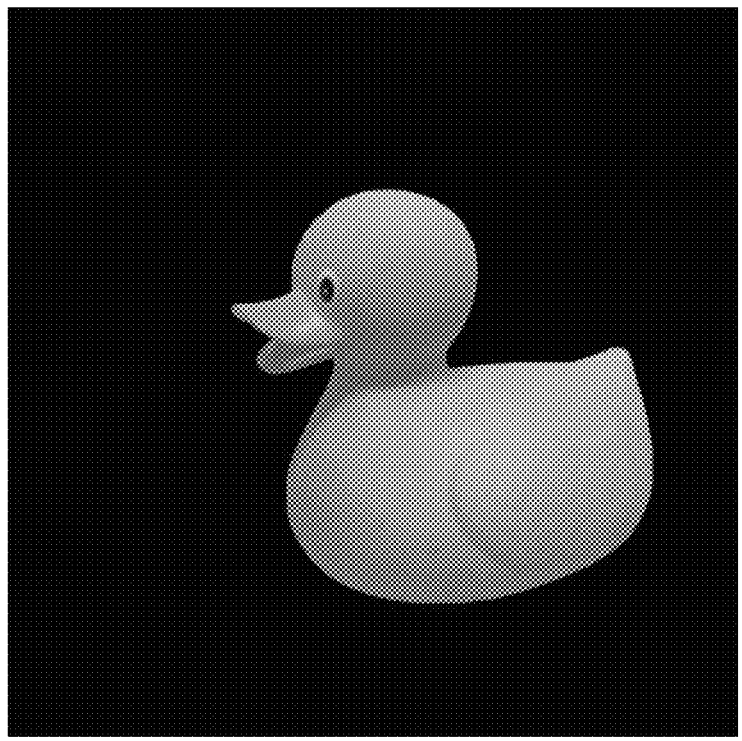
FIG. 5A illustrates an example in which content has been rendered with gamma and saturation adjustments.
Figure 5B:
FIG. 5B illustrates an example in which content rendered with gamma and saturation adjustments has been overlaid on a scene.

FIG. 5A illustrates an example in which AR virtual content has been rendered with gamma and saturation adjustments. The gamma adjustment brightens the image, but desaturates the object, for example. The saturation adjustment compensates by increasing the saturation. The AR virtual content appears brighter as a result of these image processing operations. FIG. 5B illustrates an example in which AR virtual content rendered with gamma and saturation adjustments has been overlaid on a scene. The AR virtual content resulting from the gamma and saturation adjustments is more perceptible than the baseline content used in FIG. 4B.

Figure 6A:
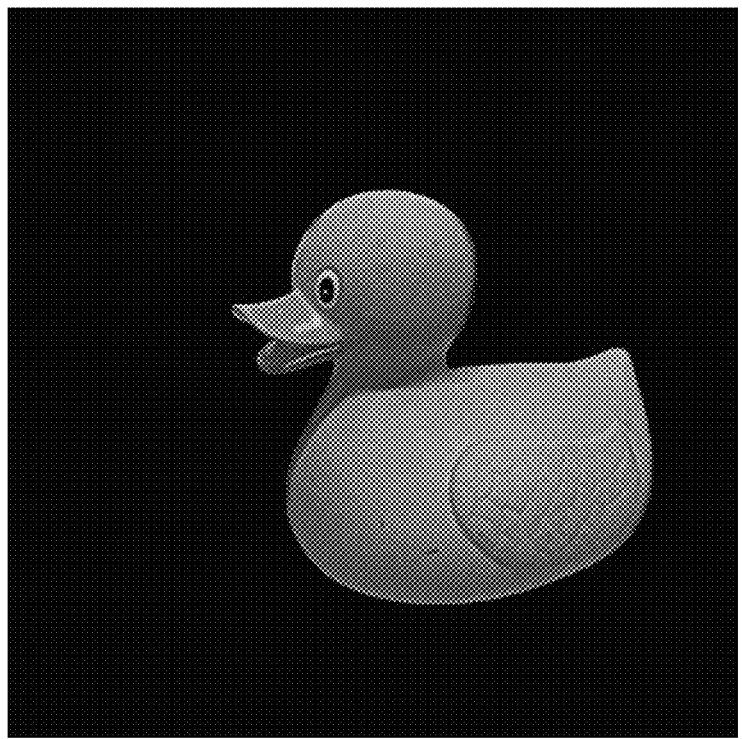
FIG. 6A illustrates an example in which content has been rendered with a high-pass filter to increase local contrast.
Figure 6B:
FIG. 6B illustrates an example in which content rendered with a high-pass filter has been overlaid on a scene.

FIG. 6A illustrates an example in which AR virtual content has been rendered with a high-pass filter to increase local contrast. The high-pass filter has the effect of increasing local contrast, making the AR virtual content more perceptible. FIG. 6B illustrates an example in which content rendered with a high-pass filter has been overlaid on a scene. The AR virtual content resulting from the high-pass filter is more perceptible than the baseline content used in FIG. 4B.

Figure 7A:
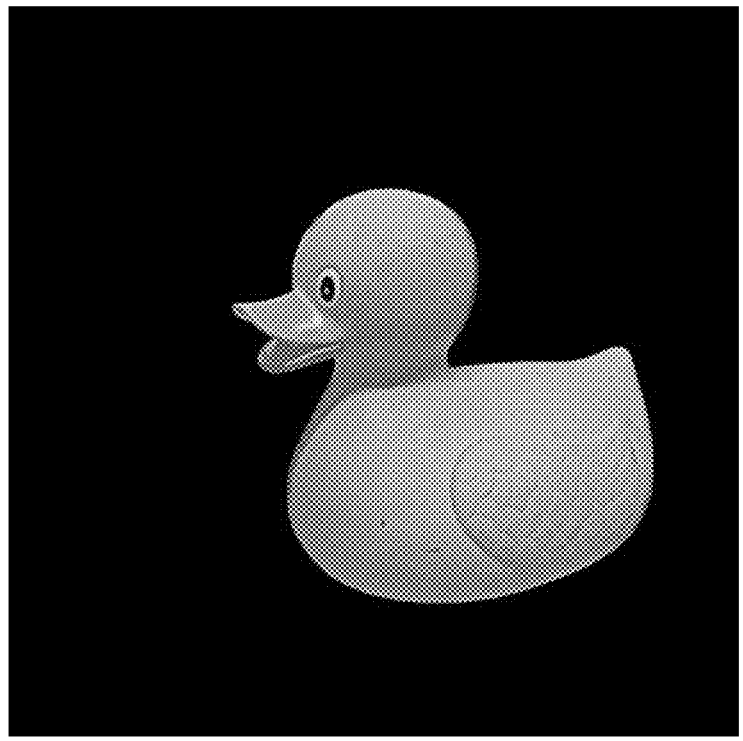
FIG. 7A illustrates an example in which content has been rendered with a high-pass filter and increased gamma and saturation.
Figure 7B:
FIG. 7B illustrates an example in which content rendered with a high-pass filter and increased gamma and saturation has been overlaid on a scene.

FIG. 7A illustrates an example in which content has been rendered with a high-pass filter and increased gamma and saturation. Combining both the high-past filter and the gamma and saturation adjustments further increases the perceptibility of the content object. FIG. 7B illustrates an example in which AR virtual content rendered with a high-pass filter and increased gamma and saturation has been overlaid on a scene. The AR virtual content resulting from the combination of the high-pass filter and the gamma and saturation adjustments is more perceptible than the AR virtual content resulting from the gamma and saturation adjustments alone (as shown above in FIG. 5B) and also more perceptible than the AR virtual content resulting from the high-pass filter alone (as shown above in FIG. 6B).

Figure 8A:
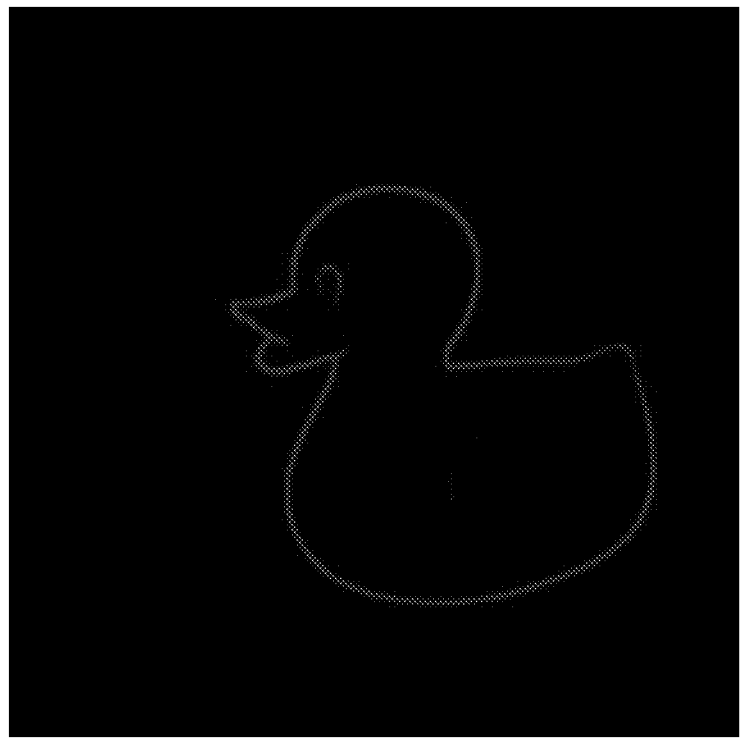
FIG. 8A illustrates an example in which content has been rendered with an outline.
Figure 8B:
FIG. 8B illustrates an example in which content rendered with an outline has been overlaid on a scene.

FIG. 8A illustrates an example in which AR virtual content has been rendered with an outline. The outline may be generated by running an edge detection pass on the object (e.g., either on the visible pixels or on the depth map) to identify the object's edges, and then using the edges to trace glowing outlines around the object. The outline is a blue-green color in this example. FIG. 8B illustrates an example in which AR virtual content rendered with an outline has been overlaid on a scene. The outline is distinctly perceptible and appears to be as bright as or brighter than the scene. The outline has a substantial amount of contrast with the scene because of its brightness, color, and/or pixel intensity, which is different from the scene's colors in the area of the AR virtual content.

Figure 9A:
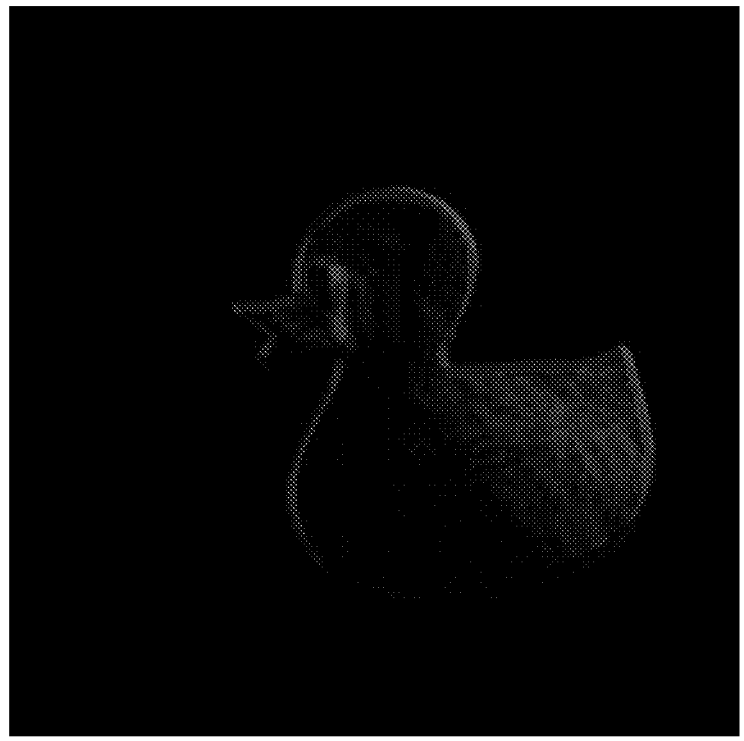
FIG. 9A illustrates an example in which content has been rendered with virtual lighting using a directional light effect.
Figure 9B:
FIG. 9B illustrates an example in which content rendered with virtual lighting using a directional light effect has been overlaid on a scene.

FIG. 9A illustrates an example in which AR virtual content has been rendered with virtual lighting using a directional light effect. The virtual lighting effect may be generated by determining depth data for the content object (e.g., from depth sensors, from stereography or by estimating it with a convolutional neural network. A normal map may then be derived from the depth data. The normal map may capture the features of the content object so that they can be relighted. Using that normal map, virtual light may be synthesized and added over the rendering of the content object. The AR virtual content object may then become more perceptible, regardless of how dark the AR virtual content object's original pixels were. The virtually-lighted AR virtual content object shown in FIG. 9A has been partially illuminated in a blue color by the virtual lighting effect. FIG. 9B illustrates an example in which AR virtual content rendered with virtual lighting using a directional light effect has been overlaid on a scene. The lighted portions of the AR virtual content object are distinctly perceptible and appear to be as bright as or brighter than the scene. The lighted portions have a substantial amount of contrast with the scene because of their brightness and blue-white color, which is different from the scene's colors in the area of the AR virtual content.

Figure 10A:
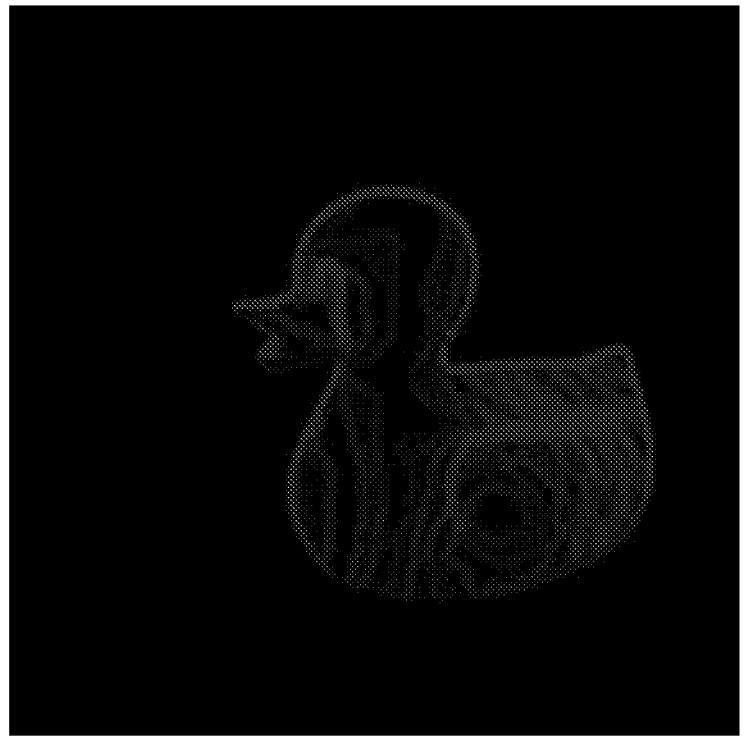
FIG. 10A illustrates an example in which content has been rendered with virtual lighting using a Fresnel effect.
Figure 10B:
FIG. 10B illustrates an example in which content rendered with virtual lighting using a Fresnel effect has been overlaid on a scene.

FIG. 10A illustrates an example in which AR virtual content has been rendered with virtual lighting using a Fresnel effect. The Fresnel effect may be applied using a virtual lighting technique similar to that described above with reference to FIG. 9A. The Fresnel effect lights is distributed across a larger area of the AR virtual content object than the directional lighting effect shown in FIG. 9A and creates a more distinct outline around the content object. FIG. 10B illustrates an example in which AR virtual content rendered with virtual lighting using a Fresnel effect has been overlaid on a scene. The lighted portions of the AR virtual content object are distinctly perceptible and appear to be as bright as or brighter than the scene. The lighted portions have a substantial amount of contrast with the scene because of their brightness and blue-white color, which is different from the scene's colors in the area of the content.

Figure 11:
FIG. 11 illustrates an example in which content rendered with a high-pass filter, gamma and saturation adjustments, an outline, and virtual lighting using a directional light effect has been overlaid on a scene.

FIG. 11 illustrates an example in which AR virtual content rendered with a high-pass filter, gamma and saturation adjustments, an outline, and virtual lighting using a directional light effect has been overlaid on a scene. The combination of these rendering changes results in a rendered AR virtual content object that is clearly perceptible against the background scene, as both the outline and area of the AR virtual content object appear substantially brighter than and different in color from the background scene.

Thus, the present adaptive rendering techniques may be provided to increase contrast between the real-world environment and the AR virtual content overlaid thereon to increase perceptibility of the rendered AR virtual content with respect to the real-world environment. In some embodiments, the present adaptive rendering techniques may adaptively adjust aspects of the appearances of the AR virtual content to improve the clarity, sharpness, perceptibility, fidelity, and identifiability of the virtual content with respect to one or more characteristics of the real-world environment onto which the AR virtual content is overlaid. Further, it should be appreciated that while aspects of the appearances of the AR virtual content may be adaptively adjusted, the present adaptive rendering techniques may do so without compromising or distorting the desirable and expected appearances of the AR virtual content (e.g., leaves of a tree desirably and expected to include hues of green may not be adjusted to appear pink in hue).

Figure 12:
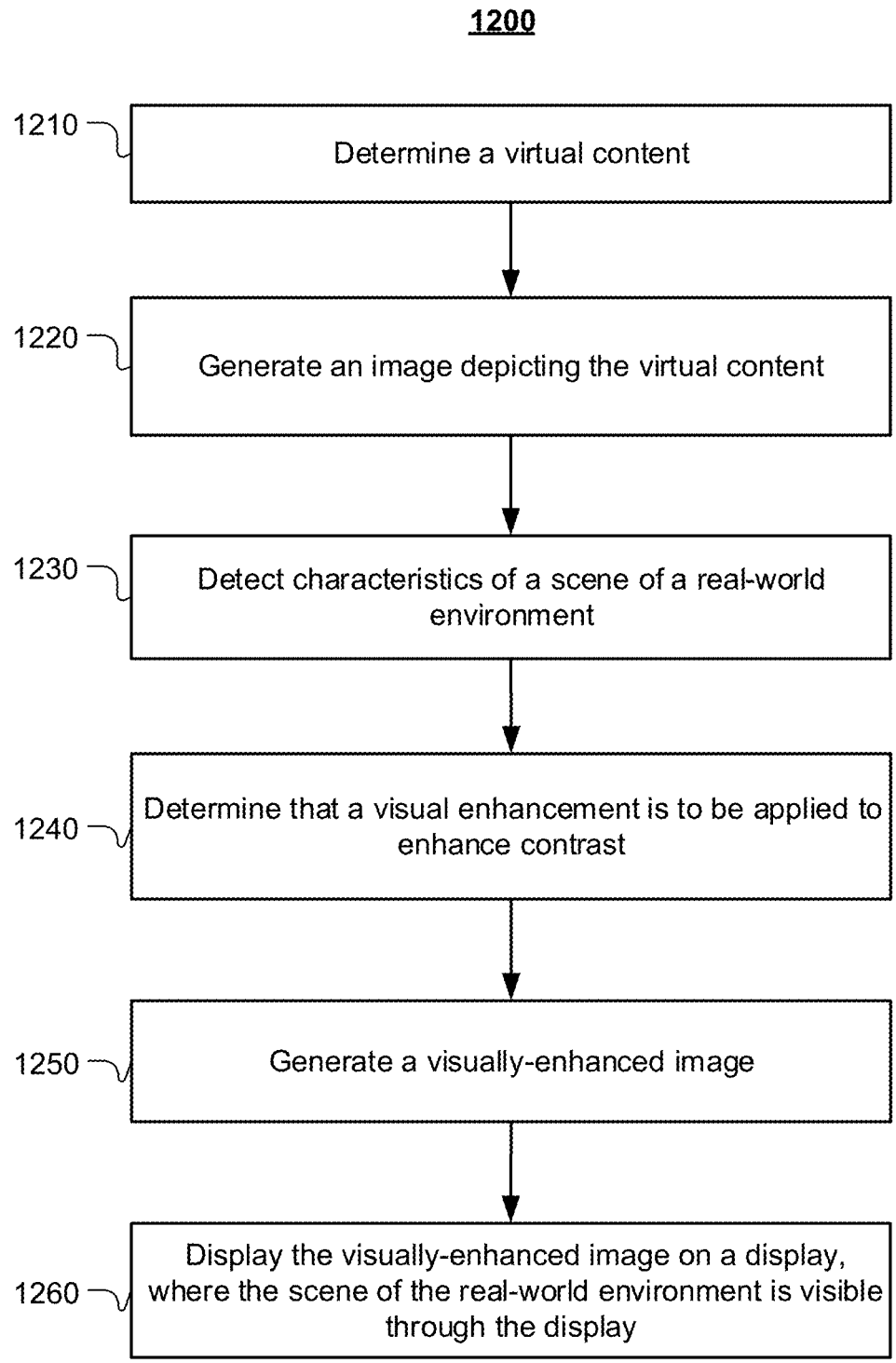
FIG. 12 illustrates an example method for adaptively rendering virtual content in an augmented-reality system.

FIG. 12 illustrates an example method 1200 for adaptively rendering AR virtual content in an augmented-reality system. The method may be performed by a computing device of the AR system, for example, by instructions executed by a controller of an HMD 100, or the like. The method may begin at step 1210, where a computing device for displaying augmented reality may determine AR virtual content to be displayed with a scene of a real-world environment. The AR virtual content could be a 3D or 2D object. For example, the rubber ducky shown in the previous figures (e.g., FIG. 4A) may be a 3D AR virtual content that an AR application determines is to be displayed to the user. Alternatively, the AR virtual content could be a 2D banner or graphical user interface. The AR virtual content could also be a virtual representation of another person. For example, in an embodiment where another person may be talking to the user of the computing device from a remote location, that person's device may capture image and other sensor data of the person (e.g., depth data, normal map, etc.). The captured data may be sent to the computing device of the user, which the user may use to generate a virtual representation of the other person.

At step 1220, the computing device may generate an image depicting the AR virtual content. The image of the AR virtual content may be generated using any suitable rendering pipeline. For example, if the AR virtual content is a 3D rubber ducky, the rendering system may generate a 2D image of the 3D rubber ducky from a particular viewpoint of interest. The 2D image would depict the 3D rubber ducky.

At step 1230, the computing device may detect, using one or more sensors, characteristics of the scene of the real-world environment. A sensor, for example, may be couplers 150, 152, a camera, an ambient light sensor, a depth sensor, motion sensor, or any other type of sensor. Using the data provided by the sensors, the computing device may detect certain characteristics of the scene. For example, based on image data, the computing device may determine color, luminance, pixel intensity, and/or saturation of the scene. The computing device may additionally or alternatively determine information associated with objects in the scene, such as their location, depth, and clutter. In particular embodiments, objects in the scene may be detected using any suitable computer vision techniques.

At step 1240, the computing device may determine, based on the image and the characteristics of the scene, that a visual enhancement is to be applied to the AR virtual content depicted in the image to enhance a contrast between the depicted AR virtual content and the scene. The AR virtual content depicted in the visually-enhanced image, when displayed over the scene, would be more perceptible than the AR virtual content depicted in the initially-generated image. The contrast between the visually-enhanced image and the scene may be higher than a contrast between the image and the scene.

In particular embodiments, the computing device may determine that a visual enhancement is desired based on an assessment of whether the AR virtual content in the image, when displayed with the scene, would likely have poor perceptibility. The device may make such an assessment by comparing characteristics of the scene with characteristics with the image. For example, if the image having low additive contrast is an issue, and the underlying scene having high spatial variability is an issue, then the computing device may conclude that perceptibility may be an issue. Indeed, in some embodiments, one or more predetermined thresholds may be programmed into the computing device to selectively trigger when to perform adaptive rendering. For example, a look-ahead analysis of particular a scene may be performed to determine whether or not the potential perceptibility is favorable (e.g., independent of the image AR virtual content to be rendered).

In particular embodiments, the determination to apply the visual enhancement may be based on one or more user preferences for rendering AR virtual content on an AR display of the computing device. In particular embodiments, the user may specify that rendering is to adhere to certain rules. The user may specify the rules and, optionally, may specify that the rules are to be followed when possible or are always to be followed. The user preferences may include a prioritization preference that controls whether the rendered AR virtual content is to be displayed at higher quality (e.g., greater clarity) than the real-world scene, or vice-versa. The user preferences may also include a safety level, which may specify that content should not be rendered over scene objects that could affect the user's physical safety, such as a fire hydrant or a flight of stairs. Rendering content over such safety-related objects may reduce the perceptibility of the objects, thereby reducing the user's safety because the user may not see the objects. For example, to prevent the virtual object from occluding hazards, the computing device may identify an initial area of the scene where the virtual content depicted in the image is to be displayed. Then, the device may identify an alternative area of the scene that is suitable for displaying the AR virtual content. The AR virtual content depicted in the visually-enhanced image may be displayed over the alternative area of the scene. Since the visually-enhanced image of the virtual object could drown out the background area over which it is displayed, the device may further ensure that the alternative area is free of physical hazards for the user of the computing device (e.g., hazards such as a tree, building, dog, another person, or any physical object that is within a threshold proximity to the user). The selected alternative area may have a greater contrast with the AR virtual content than the initial area of the scene. The alternative area may also be within a threshold distance of the initial area of the scene to prevent the alternative area from deviating too far from the originally-intended area.

In particular embodiments, the user preferences may also include a social access level, which may specify whether to allow rendering of AR virtual content over, for example, real-world people in particular scene of the real-world environment. Continuing with the example above, the computing device may further determine that the alternative area of the particular scene is free of people before selecting the area for displaying the AR virtual content. In certain embodiments, the social access level may also be used to restrict the allowed rendering regions of the particular scene based on, for example, how natural it is for the user's gaze to be directed at those regions. For example, if the person's gaze is unlikely to be directed to the far left or far right edge of the particular scene, then the AR virtual content may not be rendered in regions at the far left or right side of the particular scene. Instead, the AR virtual content may be rendered closer to the center of the display, where the user, for example, may be more likely to direct their gaze.

At step 1250, the computing device may generate a visually-enhanced image depicting the AR virtual content by applying the visual enhancement to the AR virtual content depicted in the image. The visually-enhanced image, as described elsewhere herein, improves the perceptibility of the AR virtual content when it is displayed with the scene of the real-world environment. Any combination of the techniques described herein may be applied to achieve this goal. For example, the visually-enhanced image may include a line drawn around a perimeter of the AR virtual content depicted in the visually-enhanced image. As another example, applying the visual enhancement may include adjusting a gamma of the virtual content depicted in the image. The visual enhancement may also be applied by providing a 3D light source to the AR virtual content. This may include, for example, accessing a accessing a normal map of the AR virtual content and generating one or more virtual lighting effects for the AR virtual content based on the normal map. In an embodiment where the AR virtual content is a person, the normal map may be generated based on depth data of the person captured by a device used by the person. As yet another example, the visual enhancement may be applied by increasing local contrast by applying a high-pass filter to the AR virtual content depicted in the image and/or increasing saturation of the AR virtual content depicted in the image.

In particular embodiments, the brightness of the scene of the real-world environment may also be reduced. The brightness of the scene may be reduced so that the reduced brightness of the scene is lower than a brightness level at which the visually-enhanced image is displayed. The brightness of the scene may be adjusted by changing the headset display using global dimming and/or local dimming.

At step 1260, the computing device may display the visually-enhanced image of the AR virtual content on a display of the computing device. The scene of the real-world environment may be perceptible through the display (e.g., the display is that of a pair of AR glasses), so that when the visually-enhanced image is displayed, the AR virtual content would appear with the scene. In this way, the present adaptive rendering techniques may be provided to increase contrast between the real-world environment and the AR virtual content overlaid thereon to increase perceptibility of the rendered AR virtual content with respect to the real-world environment. In some embodiments, the present adaptive rendering techniques may adaptively adjust aspects of the appearances of the AR virtual content to improve the clarity, sharpness, perceptibility, fidelity, and identifiability of the virtual content with respect to one or more characteristics of the real-world environment onto which the AR virtual content is overlaid. Further, it should be appreciated that while aspects of the appearances of the AR virtual content may be adaptively adjusted, the present adaptive rendering techniques may do so without compromising or distorting the desirable and expected appearances of the AR virtual content (e.g., leaves of a tree desirably and expected to include hues of green may not be adjusted to appear pink in hue). Additionally, the present adaptive rendering techniques may also be selectively and optimally applied based on the particular application or other performance metric, such that a particular one or more of the present adaptive rendering techniques may be selected and applied to limit power consumption and processing power, for example, while other adaptive rendering techniques may be applied to increase computational efficiency and storage capacity, and vice-versa.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for adaptive rendering including the particular steps of the method of FIG. 12, this disclosure contemplates any suitable method for adaptive rendering including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

In particular embodiments, the visual enhancement of the AR virtual content may be generated using one or more of the following techniques. Tone Mapping (e.g., gamma adjustment and/or through the use of a 1D or 3D look-up table (LUT)) or Gamut Mapping may be used to algorithmically perform a correction.

In particular embodiments, dynamic color changing may be used to render the content in a suitable color for perceptibility, identifiability, fidelity and/or recognizability, based on the knowledge of the colors present in the field of view of the detection device (e.g., based on color in the scene). This technique may take the properties of additive displays into account when determining the suitable color for perceptibility (e.g., green AR virtual content on a white background may appear to be a different color than green AR virtual content on a red background).

In particular embodiments, dynamic segmentation and region adjustment may be used to determine what part of a physical object is behind rendered content. This technique may modify an image to account for differences in physical background and thereby allow for a uniform representation. For example, if the bottom half of an object being rendered overlays a white desk and the top half overlays a blue carpet, this technique may identify those two regions of the object and make per-region adjustments so that the object appears uniform to the user despite the objects in the background.

In particular embodiments, the locations in a scene at which the AR virtual content would appear clearly may be identified, and the content may be placed in those locations. If a better location becomes available after the content is placed, a specific gesture or command may automatically move the content to the new location. Further, it may be inappropriate to place certain types of content in certain places. For example, certain content, such as facial features of certain AR virtual content, may make the most sense at the head height of the device wearer and not on the floor or in a trash can. As such, predefined filters or rules may be applied to the contextual information gathered about the scene. For example, certain locations may result in a less than desirable user experience because the location may include unnatural head positions (e.g., needing to look farther up or down than usual) or include socially-unacceptable behaviors (e.g., staring at a person's shirt or having to glance far away from a person the user is talking to). Content placement should avoid such sub-optimal locations.

In particular embodiments, the location at which content is to be placed can be determined using rules or a merit function based on the physical properties of the scene, which can include brightness, contrast, spatial frequency, and physical location. Placement rules may specify that, for example, a facial position cannot ordinarily be on the ground or on the ceiling. These constraints may be machine-learned or specified as algorithmic rules. A merit function may be used to determine merit scores for regions of the scene. The merit score may be based on the brightness, contrast, and spatial frequency, such that higher values of the merit score correspond to values of those factors that are better for placement of the content. The merit function may be based on the particular content to be placed as well as on the candidate region in the scene so that, for example, the merit function may be based on the difference in contrast between the content and the candidate region. The goal when placing content may be to find, for a set of those properties, an optimal configuration that has high contrast and low brightness.

As an example, a first region may be a preferable location for brightness, contrast, and spatial frequency masking, but a second region may also be good for those properties and better than the first region in terms of the physical location in the world, for example, because the second region is closer to eye level, is closer to where the content was displayed at a previous time, or a bigger region around the second region is favorable, whereas for the first region, a more limited region is favorable. These cases may be evaluated by the merit function, which can weight them appropriately depending on what results in the best outcomes. The merit function may be applied when deciding whether to place content and how to place content.

In particular embodiments, dynamic focal plane adjustments may be used in a varifocal system to identify a desirable focal plane based on the environment. In fixed focus systems, the information from the detection stage can inform what blur, size change, or other rendering modification to make to the content (possibly also font change for text) to avoid a contrast masking effect. Contrast masking refers herein to interference from similar frequency channels across different types of content. Defocus attenuates high-frequency content and may attenuate the amount of masking through contrast attenuation. Furthermore, in some embodiments, it may be useful to, for example, intentionally select to render AR virtual content at the same focal plane as certain real-world features, such as in situations in which it may not be suitable to boost the contrast ratio of the content enough to prevent a user's gaze from preferentially focusing on the background, for example. In such a case, the AR virtual content may still appear in focus even if, for example, the user is focusing on the background instead of the content.

In particular embodiments, rendering adjustments may be made using depth data. In one embodiment, the depth data may be produced by a mobile device when photos are captured, for example. In another embodiment, the depth data may be captured, for example, in real-time or near real-time. Rendering adjustments using depth data include lighting, 2D image processing, and topographical adjustments. Depth-based lighting adjustments may be used to illuminating AR virtual content (e.g., AR virtual content may include stickers, text, avatars, images, videos, or objects) with virtual light. For example, if AR virtual content being rendered has dark features or is dimly lighted, there might not be a sufficient number of bright pixels to make them perceptible over a real-world background. This shortage of bright pixels can be solved by virtually relighting the bright pixels, for example. For example, the relighting process starts by getting depth data from the AR virtual content (from depth sensors, from stereography or by estimating it with a convolutional neural network). A normal map can be derived from the depth data. The normal map captures the features of the AR virtual content so that they can be relighted. Using that normal map, virtual light can be synthesized and added over the rendering of the AR virtual content, rendering the AR virtual content perceptible regardless of how dark the original pixels were. Virtual lighting may be generated based on the normal may using, for example, Phong-style lighting, Fresnel edge effects, matcaps, cubemap environment lighting, or cavity mapping/ambient occlusion. In certain embodiments, for example, two or more of these different lighting techniques may be combined (e.g. directional lighting plus Fresnel and environmental lighting). Virtual lighting may be used as a dynamic user interface element that may change light color or direction to reflect state or to match ambient light. The direction from which virtual lighting originates may vary as a function of relative viewer/subject position to improve the illusion of presence (e.g., to make the virtual lighting on the AR virtual content match the lighting in the viewer's environment, adapting it dynamically as the viewer walks around or changes lighting conditions).

In particular embodiments, the Hermann grid illusion and the OFF pathway may be used to displaying a brightened outline around a dark content object. For example, in some embodiments, rendering content to leverage the integration and processing paths of the human visual system and the environment. In this embodiment, local contrast can be boosted by activating the OFF pathway of the visual system through lateral inhibition. This effect can be used by, for example, maximizing: 1) lateral contrast effect, or simultaneous contrast effect (as is done in the Hermann grid illusion) and 2) post-receptoral OFF pathway. For example, by surrounding or/and offsetting a content with white, the surrounded content looks darker by contrast effect and off pathway response, which is optimized to respond to darker stimuli. Example effects that could be rendered around the AR virtual content (e.g., AR virtual content may include stickers, text, avatars, images, videos, or objects) to create this effect include a white outline, a white gaussian blur, a brighter natural background (which may be achieved by taking the video feed from a camera on the device, brightening it, and then re-rendering it where the AR virtual content will be located, and then rendering the AR virtual content on top of that), or global offset and compression of the signal.

In particular embodiments, a cartoon effect may be generated using semantic data. An AR tool may be used to create a face mask for adjusting the rendering. An example use is to create lines around features to make them stand out. For more stylized and illustrative rendering effects, the AR tool can be used to create an inclusive rendering face mask. This technique generates a mesh with semantically useful features (eyes, nose, lips, eyebrows, chin, cheeks, etc.). The mesh may be used to draw lines around, for example, facial features of the AR virtual content, so the features stand out against a background, even if the features are not otherwise perceptible. This mesh can also be used to relight, for example, the facial features of the AR virtual content.

In particular embodiments, transparency adjustments may be made to the content objects. For safety reasons, the rendering engine may increase transparency of content to make it see-through. This effect allows the user to better see the real world, depending on the information received from the detection stage.

In particular embodiments, 2D image processing techniques may be used to increase the visibility of content objects. For example, certain AR virtual content may be made perceptible by filtering, outlining, or adjusting the colors the AR virtual content. In some embodiments, a combination of image processing techniques, as well as additional virtual lighting may markedly improve the perceptibility of the AR virtual content. Certain processing techniques may include, for example, (1) brightening the rendering by tuning the gamma (brightening has the effect of desaturating the content, making them look washed out; saturation can be increased to compensate), (2) running a high-pass filter on the content to increase local contrast, making the AR virtual content more perceptible, (3) applying a color-look-up-table (e.g., CLUT) to locally brighten and saturate feature tones, and (4) running an edge detection pass on the AR virtual content (either on the visible pixels or on the depth map) and then using the edges to trace glowing outlines around the AR virtual content.

In particular embodiments, depth-based topographical adjustments may be performed in increase the perceptibility of content objects. Projected pattern effects may be generated based on depth data. A pattern, such as lines or a checkerboard, may be overlaid on a content object and displaced using the depth data. The depth data may be used to cause the pattern to conform to the shape of the content object in real time. The pattern may be added over the content object, revealing its shape and form by adding visible structure even the content object is not otherwise directly perceptible.

In certain embodiments, AR virtual content may be tagged for rendering. Particularly, because AR virtual content may render differently on different monitors, AR virtual content rendered in an additive light headset may not necessarily have the same appearance as the original content. For example, artists may desire to adjust the content by hand in their authoring tools to improve its appearance in the VR headset. Accordingly, in certain embodiments, an algorithmic and dynamic technique may be used for achieving such appearance adjustments by defining and using tags for the AR virtual content. The tags may be applied by an artist or automatically, for example. The tags may include Photorealistic/TrueToSource, HighVisibility, TrueToDestination, and TrueToEnvironment. For AR virtual content tagged with the Photorealistic/TrueToSource tag, the rendering engine may account for the information from the detection stage and adjust certain values (e.g. contrast, saturation, hue, etc.) to make that content appear true to the origin of the content. For AR virtual content tagged with the HighVisibility tag, the rendering engine may account for the information from the detection stage and adjust certain values (e.g. contrast, saturation, hue, etc.) to make that content as perceptible as possible to the user, without concern for over-modifying the AR virtual content to achieve the desired perceptibility. For AR virtual content tagged with the TrueToDestination tag, the rendering engine may render the content without modification. In one embodiment, the TrueToDestination tag may be determined to be utilized because the TrueToDestination tag may provide a reduction in power consumption, for example. For AR virtual content rendered with the TrueToEnvironment tag, for example, the rendering engine may render the content to appear as if it is present in that environment (e.g., appear darker because it is in the shadow of a real object). In particular embodiments, another optimization involves accounting for current dim state of the lenses. Passive dimming that is controlled by exposure to the sun's UV rays can cause the lenses to have varying levels of light passthrough. The current passthrough amount may be used when determining how to apply any of the above techniques.

Thus, the forgoing present adaptive rendering techniques may be provided to increase contrast between the real-world environment and the AR virtual content overlaid thereon to increase perceptibility of the rendered AR virtual content with respect to the real-world environment. In some embodiments, the present adaptive rendering techniques may adaptively adjust aspects of the appearances of the AR virtual content to improve the clarity, sharpness, perceptibility, fidelity, and identifiability of the virtual content with respect to one or more characteristics of the real-world environment onto which the AR virtual content is overlaid. Further, it should be appreciated that while aspects of the appearances of the AR virtual content may be adaptively adjusted, the present adaptive rendering techniques may do so without compromising or distorting the desirable and expected appearances of the AR virtual content (e.g., leaves of a tree desirably and expected to include hues of green may not be adjusted to appear pink in hue).

System Overview

Figure 13:
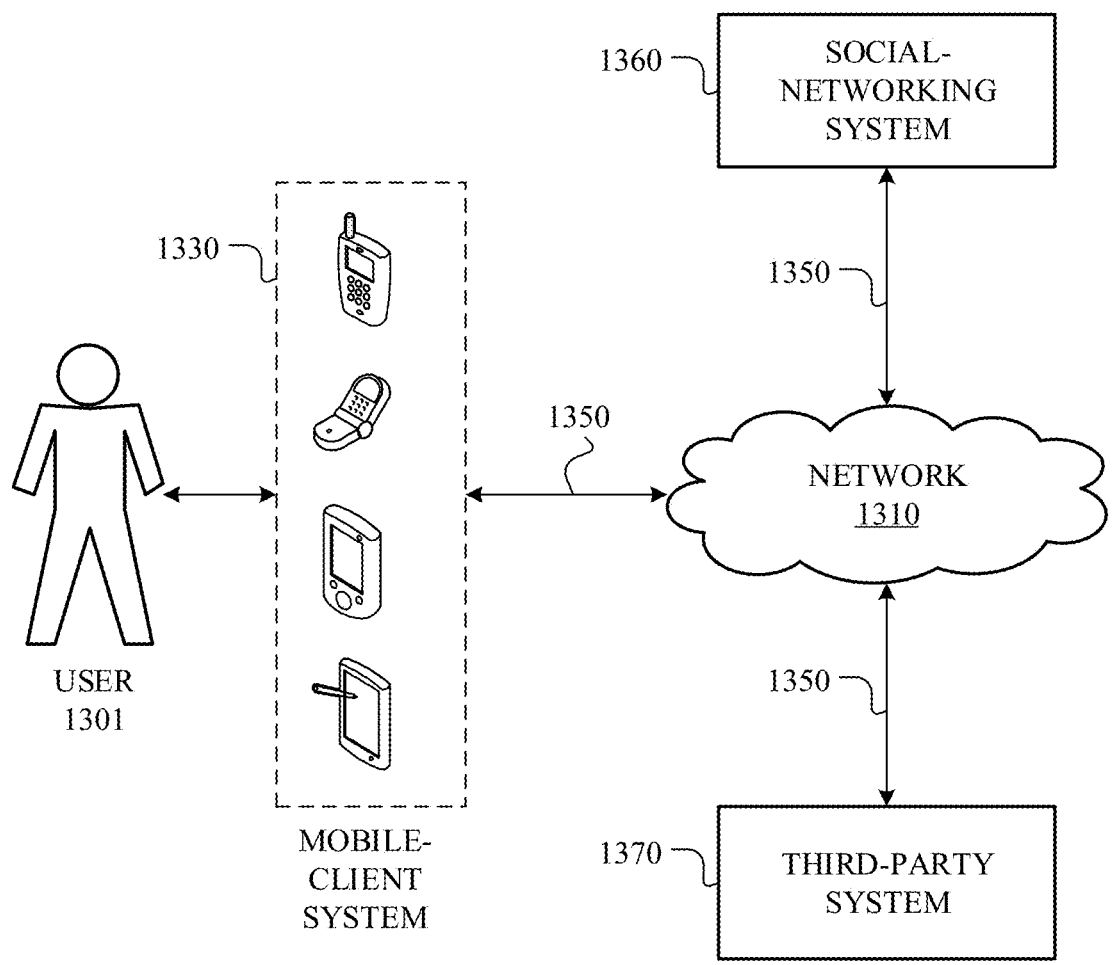
FIG. 13 illustrates an example network environment associated with a social-networking system.

FIG. 13 illustrates an example network environment 1300 associated with a social-networking system. Network environment 1300 includes a user 1301, a client system 1330, a social-networking system 1360, and a third-party system 1370 connected to each other by a network 1310. Although FIG. 13 illustrates a particular arrangement of user 1301, client system 1330, social-networking system 1360, third-party system 1370, and network 1310, this disclosure contemplates any suitable arrangement of user 1301, client system 1330, social-networking system 1360, third-party system 1370, and network 1310. As an example, and not by way of limitation, two or more of client system 1330, social-networking system 1360, and third-party system 1370 may be connected to each other directly, bypassing network 1310. As another example, two or more of client system 1330, social-networking system 1360, and third-party system 1370 may be physically or logically co-located with each other in whole or in part. Moreover, although FIG. 13 illustrates a particular number of users 1301, client systems 1330, social-networking systems 1360, third-party systems 1370, and networks 1310, this disclosure contemplates any suitable number of users 1301, client systems 1330, social-networking systems 1360, third-party systems 1370, and networks 1310. As an example, and not by way of limitation, network environment 1300 may include multiple users 1301, client system 1330, social-networking systems 1360, third-party systems 1370, and networks 1310.

In particular embodiments, user 1301 may be an individual (human user), an entity (e.g., an enterprise, business, or third-party application), or a group (e.g., of individuals or entities) that interacts or communicates with or over social-networking system 1360. In particular embodiments, social-networking system 1360 may be a network-addressable computing system hosting an online social network. Social-networking system 1360 may generate, store, receive, and send social-networking data, such as, for example, user-profile data, concept-profile data, social-graph information, or other suitable data related to the online social network. Social-networking system 1360 may be accessed by the other components of network environment 1300 either directly or via network 1310. In particular embodiments, social-networking system 1360 may include an authorization server (or other suitable component(s)) that allows users 1301 to opt in to or opt out of having their actions logged by social-networking system 1360 or shared with other systems (e.g., third-party systems 1370), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 1370 may be accessed by the other components of network environment 1300 either directly or via network 1310. In particular embodiments, one or more users 1301 may use one or more client systems 1330 to access, send data to, and receive data from social-networking system 1360 or third-party system 1370. Client system 1330 may access social-networking system 1360 or third-party system 1370 directly, via network 1310, or via a third-party system. As an example, and not by way of limitation, client system 1330 may access third-party system 1370 via social-networking system 1360. Client system 1330 may be any suitable computing device, such as, for example, a personal computer, a laptop computer, a cellular telephone, a smartphone, a tablet computer, or an augmented/virtual reality device.

This disclosure contemplates any suitable network 1310. As an example, and not by way of limitation, one or more portions of network 1310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1310 may include one or more networks 1310.

Links 1350 may connect client system 1330, social-networking system 1360, and third-party system 1370 to communication network 1310 or to each other. This disclosure contemplates any suitable links 1350. In particular embodiments, one or more links 1350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links.

In particular embodiments, one or more links 1350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1350, or a combination of two or more such links 1350. Links 1350 need not necessarily be the same throughout network environment 1300. One or more first links 1350 may differ in one or more respects from one or more second links 1350.

Figure 14:
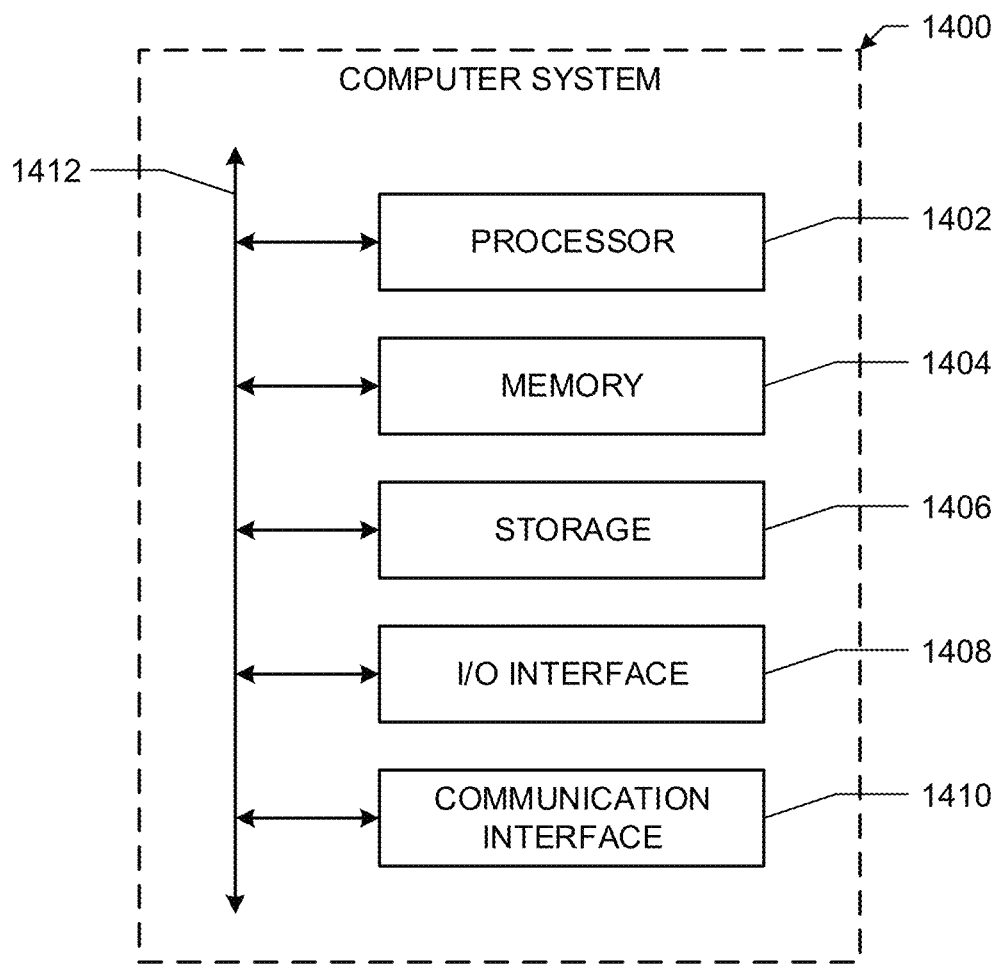
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example, and not by way of limitation, one or more computer systems 1400 may perform in real-time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example, and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example, and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example, and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example, and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example, and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example, and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   obtaining a measurement of ambient light associated with a scene of a real-world environment;
   applying a virtual lighting effect to virtual content based at least in part on the measurement of the ambient light; and
   causing display of the virtual content with the applied virtual lighting effect on a display of a computing device for displaying augmented reality, wherein the scene of the real-world environment is visible through the display,
   wherein the applied virtual lighting effect comprises an outline around the virtual content, the outline having an increased brightness that contrasts with the scene.

2. The method of claim 1, wherein a portion of the virtual lighting effect, distinct from the outline around the virtual content, matches a color or a direction of the ambient light.

3. The method of claim 1, further comprising dynamically adapting the virtual lighting effect to match the ambient light.

4. The method of claim 1, further comprising dynamically adapting the virtual lighting effect to match the ambient light as a user of the computing device moves through the real-world environment.

5. The method of claim 1, wherein the virtual lighting effect comprises at least one of: Phong-style lighting, directional lighting, Fresnel edge effects, and environmental lighting.

6. The method of claim 1, wherein the applied visual lighting effect is based on detected depth data of the virtual content.

7. The method of claim 1, wherein the virtual lighting effect is applied based in part on one or more attributes of the virtual content.

8. The method of claim 1, wherein:
   the applied virtual lighting effect is configured to improve a low visual perceptibility of a dark feature of the virtual content, and
   the low visual perceptibility of the dark feature of the virtual content is determined based on a number of bright pixels of the dark feature being insufficient to make the dark feature perceptible.

9. The method of claim 1, wherein:
   the computing device for displaying augmented reality is a head-mounted display; and
   the method of claim 1 is performed at the head-mounted display.

10. A non-transitory computer-readable storage medium comprising instructions that, when executed by one or more processors, cause the processors to:
    obtain a measurement of ambient light associated with a scene of a real-world environment;
    apply a virtual lighting effect to the virtual content based at least in part on the ambient light; and
    cause display of the virtual content with the applied virtual lighting effect on a display of a computing device for displaying augmented reality, wherein the scene of the real-world environment is visible through the display,
    wherein the applied virtual lighting effect comprises an outline around the virtual content, the outline having an increased brightness that contrasts with the scene.

11. The non-transitory computer-readable storage medium of claim 10, wherein a portion of the virtual lighting effect, distinct from the outline around the virtual content, matches a color or a direction of the ambient light.

12. The non-transitory computer-readable storage medium of claim 10, further comprising instructions for dynamically adapting the virtual lighting effect to match the ambient light.

13. The non-transitory computer-readable storage medium of claim 10, further comprising instructions for dynamically adapting the virtual lighting effect to match the ambient light as a user of the computing device moves through the real-world environment.

14. The non-transitory computer-readable storage medium of claim 10, wherein the virtual lighting effect comprises at least one of: Phong-style lighting, directional lighting, Fresnel edge effects, and environmental lighting.

15. The non-transitory computer-readable storage medium of claim 10, wherein the applied visual lighting effect is based on detected depth data of the virtual content.

16. The non-transitory computer-readable storage medium of claim 10, wherein the virtual lighting effect is applied based in part on one or more attributes of the virtual content.

17. The non-transitory computer-readable storage medium of claim 10, wherein:
    the virtual lighting effect is applied to improve a low visual perceptibility of a dark feature of the virtual content, and
    the low visual perceptibility of the dark feature of the virtual content is determined based on a number of bright pixels of the dark feature being insufficient to make the dark feature perceptible.

18. The non-transitory computer-readable storage medium of claim 10, wherein:
    the computing device for displaying augmented reality is a head-mounted display; and
    the one or more processors are in the computing device.

19. A computing device comprising one or more processors configured to:
    obtain a measurement of ambient light associated with a scene of a real-world environment;
    apply a virtual lighting effect to virtual content based at least in part on the ambient light; and
    cause display of the virtual content with the applied virtual lighting effect on a display of a computing device for displaying augmented reality, wherein the scene of the real-world environment is visible through the display,
    wherein the applied virtual lighting effect comprises an outline around the virtual content, the outline having an increased brightness that contrasts with the scene.

20. The computing device of claim 19, wherein a portion of the virtual lighting effect, distinct from the outline around the virtual content, is configured to match a color or a direction of the ambient light.

* * * * *